United States Patent
Honkomp et al.

(10) Patent No.: US 6,345,229 B1
(45) Date of Patent: Feb. 5, 2002

(54) METHOD OF AND DEVICE FOR DETERMINING A POSITION OF A VEHICLE

(75) Inventors: Dieter Honkomp; Volkmar Tanneberger, both of Hildesheim; Peter Kreft, Hemmingen; Guenter Noetzel, Diekholzen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/541,936

(22) Filed: Apr. 3, 2000

(30) Foreign Application Priority Data

Apr. 3, 1999 (DE) .......................... 199 15 212

(51) Int. Cl.[7] .............................. G01S 5/14; G01C 21/30
(52) U.S. Cl. ...................... 701/207; 701/214; 701/216
(58) Field of Search ................................ 701/300, 207, 701/214, 216, 208; 342/357.14, 357.08; 340/995, 988

(56) References Cited

U.S. PATENT DOCUMENTS

| | | | |
|---|---|---|---|
| 4,713,767 A | * 12/1987 | Sato et al. .................. 701/220 |
| 5,119,301 A | 6/1992 | Shimizu et al. | |
| 5,155,688 A | 10/1992 | Tanaka et al. | |
| 5,311,195 A | * 5/1994 | Mathis et al. ................ 342/357 |
| 5,394,333 A | * 2/1995 | Kao ............................. 701/217 |
| 5,488,559 A | * 1/1996 | Seymour ...................... 701/208 |
| 5,523,761 A | * 6/1996 | Gildea ......................... 342/357 |
| 5,563,786 A | * 10/1996 | Torii ............................. 701/23 |
| 5,995,023 A | 11/1999 | Kreft | |
| 6,002,981 A | 12/1999 | Kreft | |
| 6,014,608 A | 1/2000 | Seo | |

FOREIGN PATENT DOCUMENTS

JP 61-116615 * 6/1986

* cited by examiner

*Primary Examiner*—Michael J. Zanelli
(74) *Attorney, Agent, or Firm*—Michael J. Striker

(57) ABSTRACT

A position of a vehicle is determined by outputting position signals by a reception antenna and outputting traveling condition values by traveling condition sensors of a vehicle for determination of an absolute position of the vehicle and outputting an absolute position signal, from the absolute position signal and predetermined reference data of a reference system determining a relative position of the vehicle in the reference system, determining a position quality signal from a comparison of the absolute position signal and a reference position signal, and using the position quality signal for determination of an absolute position of the vehicle.

14 Claims, 1 Drawing Sheet

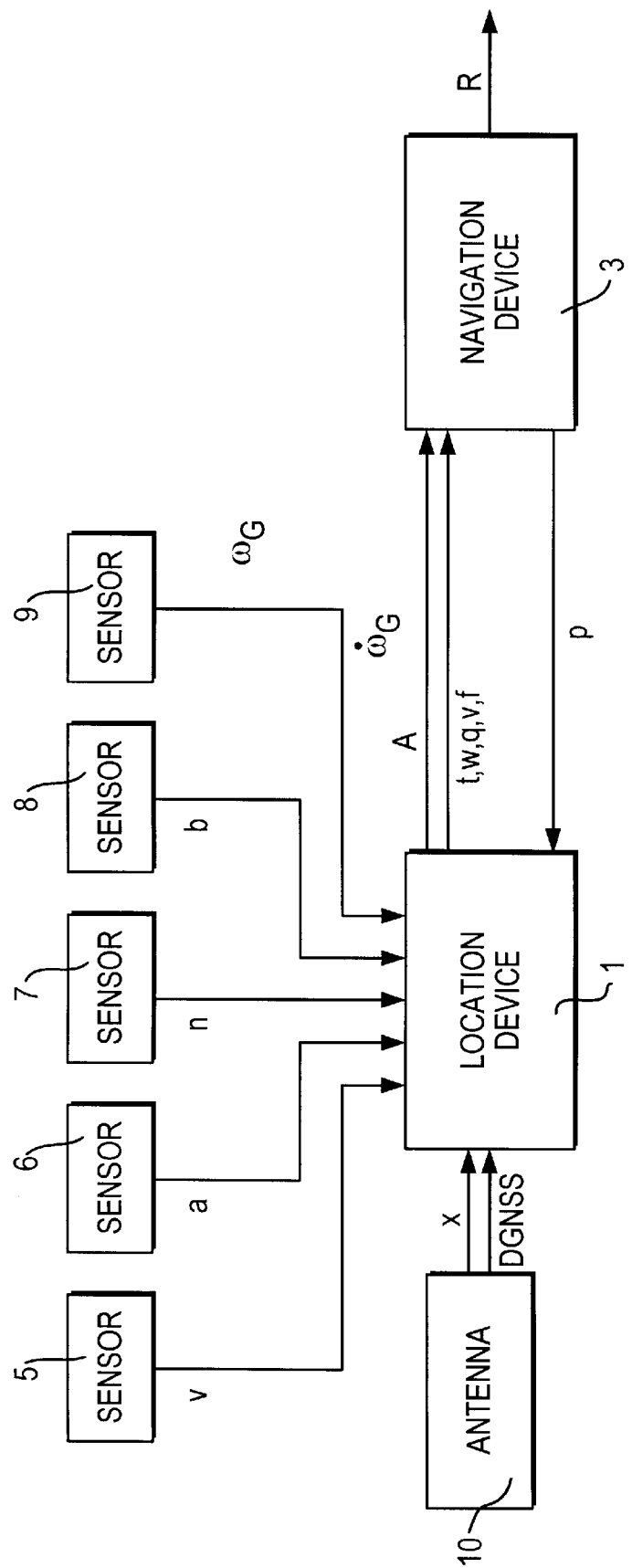

METHOD OF AND DEVICE FOR DETERMINING A POSITION OF A VEHICLE

BACKGROUND OF THE INVENTION

The present invention relates to a method of and a device for determination of a position of a vehicle.

Such methods and devices are used in particular in traffic telematic devices and navigation devices of motor vehicles. For this purpose in particular location receivers for the NAVSTAR global positioning system (GPS) or the global navigation satellite system (GNSS, GLONASS) are used, which make possible a three-dimensional position determination by time measurements to the satellites. The availability and the position accuracy of such satellite signal-receiving devices can be substantially increased by incorporation of additional sensors, such as for example rotary speed sensors, acceleration sensors and a speed sensor, when the information supplied from these sensors over the covered travel paths and traveling directions are compared with the successive position signals of the navigation satellite. For this purpose generally the corresponding sensor signals and the position signals of the receiving antenna are received by a computing device, a relative position in a predetermined reference system for example a digital card is determined from a comparison of the determined position in the card and an inputted desired location of a route and subsequently a driving command is outputted to the driver of the motor vehicle, for example via a display. During the examination of the relative position in the card systematic deviations of the sensor signals can be recognized and corresponding correction data can be determined for correcting these systematic errors in the sensor signals by the computation of the relative position in the reference system.

However, such a system has problems, in particular in that during the progressive technological development specifically of the receiving antennas and vehicle condition sensors, basically the whole computation device must be replaced. Thereby an adaptation of such a system to technological changes and improvements is difficult because of high conversion costs.

SUMMARY OF THE INVENTION

Accordingly, it is an object of present invention to provide a method of and a device for determination of a position of a vehicle, which facilitates an adaptation of a navigation system to changed technical requirements.

In keeping with these objects and with others which will become apparent hereinafter, one feature of present invention resides, briefly stated, in a method for determination a position of a vehicle, in accordance with which position signals outputted by a reception antenna and traveling condition values outputted by traveling condition sensors of the vehicle are used for determination of an absolute position of the vehicle and an absolute position signal is outputted, from the absolute position signal and preliminary outputted reference data of a reference system a relative position of the vehicle in the reference system is determined, a position quality signal is determined from a comparison of the absolute position signal and a reference position signal and the position quality signal is used for determination of the absolute position of the vehicle.

An inventive device for determination of the position of a vehicle has a locating device for determination of an absolute position of the vehicle which receives the traveling condition signals of the vehicle from vehicle sensors and position signals from a reception antenna, determines an absolute position of the vehicle and makes it available as an absolute position signal, for correction of the absolute position by taking into consideration a position quality signal, and a navigation device which receives the absolute position signal and at least few traveling condition signals from the locating device, determines a relative position signal for determination of the vehicle position in a reference system, determines the position quality signal from a deviation or dispersion of the absolute position signal from the relative position signal, and makes available the locating device.

In accordance with the present invention a locating method for determination of an absolute position of the vehicle is separated from a following navigation method for determination of the relative position of the vehicle in a reference system. By this separation in two separate methods, different algorithms and sensors or reception antennas can be used for the locating method, without the necessity to provide adaptation of the subsequent navigation methods to the different locating methods, as is the case in the interconnected methods. However, the transmission of a standardized absolute position signal and a standardized position quality signal must be guaranteed, which are independent from the special sensors and reception antennas. The two separate methods can be thereby coupled with one another by standardized signal transmissions.

The inventive device correspondingly is subdivided into two separate devices, a locating device for determination of an absolute position and a navigation device for determination of a relative position and determination of a position quality signal. These devices can be exchanged separately, without the necessity to provide adaptation of the remaining device to a new used device. When new sensors or reception antennas are available for outputting of the new or more accurate signals, no more a complete computing device for determination of the relative position of the vehicles in a reference system must be exchanged. Instead the locating device can be replaced separately. Furthermore, the locating device can be separately replaced in the case of a further development of the hardware or computation algorithm. The position quality signal can be determined for example from a difference of the absolute positions and relative positions, or a correlation of the signal determined in the navigation device.

Furthermore, further traveling condition signals or a quality signals can be outputted by the locating device to the navigation device, so that the variants determined in the locating device can be reproduced from determination of the absolute position.

In the locating device algorithms can be used with which systematic deviation of the sensor signals can be calibrated by the long-term stable position signals of the reception antenna. In this cooperation, the position quality signal of the navigation device can be in particular introduced in this calibration directly. Furthermore, an introduction of different correction data in this calibration or correction is possible in the locating device.

The locating device and the navigation device can be produced preferably each as an integrated circuit. The locating device can be for example integrated in the reception antenna.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a block diagram of a navigation system and signals which are used for it.

DESCRIPTION OF PREFERRED EMBODIMENTS

A device in accordance with the present invention in which the inventive method is used includes a locating device 1 which receives a position signal x from a reception antenna 10 and driving condition signals from sensors 5–9 in dependence on the traveling condition of the vehicle. These sensors include for example a speed measuring sensor 5 which is arranged on the driven shaft of the transmission and supplies a speed signal v, a longitudinal acceleration sensor 6 which can be used for example also for the release of air bag and/or traveling dynamic regulation and supplies a longitudinal acceleration signal a, wheel sensors 7 which supply rotary speed values n of the four wheels and can be used for example also for an antiblocking system, an electronic differential lock and a traveling dynamic regulation, a transverse acceleration sensor 8 which is used also for example for a traveling dynamic control and supplies a transverse acceleration signal v, a yaw rate or a yaw angle acceleration sensor 9 which supplies a yaw rate signal $W_G$ and/or a yaw angle acceleration signal $W_G$.

Instead of the above mentioned sensors or additionally to these sensors, further sensors can be used for determination of the traveling condition of the vehicle. Furthermore, the reception of signals is also possible from a control device of a traveling dynamic regulation, which are computed from the corresponding sensor signals, for example a vehicle speed determined from the wheel rotary speeds or the wheels. The locating device 1 can be provided in particular with a standard interface for a vehicle-internal data bus and can receive the sensor signal directly through this data bus. Furthermore, a difference correction signal (DGNSS) can be received from the reception antenna 10 for increasing the accuracy of the position signal x.

The locating device 1 has a computing device, in which the sensor signals, the position signal x and in some cases the difference correction signals DGNSS are received and an absolute position is determined. For this absolute position, in particular the position signal x is produced which however does not supply any accurate determination of the absolute position but has a high long time stability. The accurate determination of the absolute position is provided for example by using the traveling condition signals and the computation of a theoretical change of an absolute position by time integration of the traveling speed as well as with consideration of the direction or changes of the direction, which can be determined from the yaw rate, yaw acceleration and transverse acceleration.

For determination of the absolute position, in particular computing algorithms can be used with adaptive filters, which are adjusted to the corresponding signals. The thusly determined absolute position is further outputted as an absolute position A through a standard interface to a subsequent navigation device 3. Through the interface, furthermore the time t, the actual speed $v_r$, the actual traveling direction $f_r$, the traveling distance $w_t$ covered from the start of the system, as well as further actual signals can be transmitted. The absolute position can be referred in a known manner to a reference ellipsoid, for example WGS 84. Furthermore, a quality signal q or an integrity signal can be provided which can be contiguous to variants determined during the determination of the absolute position in the adaptive filter or from a status information.

In the navigation device, this data, in particular the absolute position A, can be corrected with the data of a digital card which operates as a reference signal and a map matching position or relative position can be determined. During this process the transmitted absolute position signals can be compared with preliminarily stored reference signals which are known with very high quality, so that a very accurate card position of the vehicle can be determined. Furthermore, a position quality is computed and made available as a position quality signal p at an output. The position quality can be determined for example from the difference between the actual absolute position signal and the actual reference position signal or a time averaging or correlation of several of these signals.

The position quality signal is thereby independent from the signals and data used internally in the locating device and can be utilized as standardized signal for a plurality of various locating devices. The position quality signal is subsequently outputted to the locating device 1 and utilized for a determination or correction of the corresponding algorithm for determination of the absolute position.

From the navigation device 3 furthermore a relative position or map matching position is provided as a relative position signal R, and in a subsequent device is used for comparison with an inputted target location for computation of a traveling route as well as a subsequent outputting of a driver command.

The locating device 1 and the navigation device 3 can be formed in particular on separate integrated circuits. The locating device can be also integrated in a reception antenna, so that a reception antenna can be connected directly to a data bus of the vehicle, for receiving of the corresponding traveling condition signals.

It will be understood that each of the elements described above, or two or more together, may also find a useful application in other types of constructions differing from the types described above.

While the invention has been illustrated and described as embodied in method of and device for determining a position of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A method of determining a position of a vehicle, comprising the steps of outputting position signals by a reception antenna and outputting traveling condition values by traveling condition sensors of a vehicle for determination of an absolute position of the vehicle and outputting an absolute position signal; from the absolute position signal and predetermined reference data of a reference system determining a relative position of the vehicle in the reference system, determining a position quality signal from a comparison of the absolute position signal and a reference position signal; and using the position quality signal again for a new, subsequent determination of an absolute position of the vehicle.

2. A method as defined in claim 1, wherein said determining of the absolute position signal includes determining from several temporal successively following position signals and traveling condition signals and a difference correction signals.

3. A method as defined in claim 1; and further using as the traveling condition signals at least one signal selected from the group consisting of a vehicle speed signal, a rotary speed signal of vehicle wheels, a longitudinal acceleration signal, a transverse acceleration signal, a yaw rate, a yaw angle acceleration, and a combination thereof.

4. A device for determining a position of a vehicle, comprising locating means determining an absolute position of a vehicle, receiving traveling condition signals of the vehicle from vehicle sensors and position signals from a reception antenna, determining an absolute position of the vehicle and making available as an absolute position signal, and correcting the absolute position by introducing a position quality signal; and navigating means receiving the absolute position signal and at least a few traveling condition signals from said locating means, determining a relative position signal for determination of a vehicle position in a reference system and determining a position quality signal from a deviation or dispersion of the absolute position signal from the relative position signal, and making it available to said locating means.

5. A device as defined in claim 4, wherein said navigating means is formed so as to determine the position quality signal from a correlation of several timely successive absolute position signals.

6. A device as defined in claim 4, wherein said locating means is formed so as to provide calibration of at least a few sensor signals by several timely successive position signals.

7. A device as defined in claim 4, wherein said locating means is formed so as to receive difference correction data and use them for determination of the absolute position signals.

8. A device as defined in claim 4, wherein said locating means is formed so as to transmit a signal selected from the group consisting of a speed signal, a traveling direction signal, a path integral signal, a time signal, or a combination thereof to said navigating means.

9. A device as defined in claim 4, wherein said locating means is formed so as to determine a quality signal for evaluating an accuracy of the absolute position and making it available to said navigating means, said navigating means being formed so as to produce the quality signal for determining the position quality signal.

10. A device as defined in claim 4; and further comprising an interface which connects said locating means and said navigating means with one another.

11. A device as defined in claim 4, wherein said locating means and said navigating means are formed on separate integrated circuits.

12. A device as defined in claim 4; and further comprising a reception antenna, said locating means being arranged in said reception antenna.

13. A method of determining a position of a vehicle, comprising the steps of outputting position signals by a reception antenna and outputting traveling condition values by traveling condition sensors of a vehicle for determination of an absolute position of the vehicle and outputting an absolute position signal; from the absolute position signal and predetermined reference data of a reference system determining a relative position of the vehicle in the reference system, determining a position quality signal from a comparison of the absolute position signal and a reference position signal; and using the position quality signal again for a new, subsequent determination of an absolute position of the vehicle; and using the position quality signal for calibrating sensor signals of vehicle sensors.

14. A method of determining a position of a vehicle, comprising the steps of outputting position signals by a reception antenna and outputting traveling condition values by traveling condition sensors of a vehicle for determination of an absolute position of the vehicle and outputting an absolute position signal; from the absolute position signal and predetermined reference data of a reference system determining a relative position of the vehicle in the reference system, determining a position quality signal from a comparison of the absolute position signal and a reference position signal; and using the position quality signal again for a new, subsequent determination of an absolute position of the vehicle; and correlating a signal of the absolute position with a digital map which serves as a reference signal.

* * * * *